(12) United States Patent
Kurokawa et al.

(10) Patent No.: US 12,350,868 B2
(45) Date of Patent: Jul. 8, 2025

(54) FORCED EXTRACTION MOLDED ARTICLE, POLYARYLENE SULFIDE RESIN COMPOSITION, AND METHOD FOR PRODUCING FORCED EXTRACTION MOLDED ARTICLE

(71) Applicant: DIC Corporation, Tokyo (JP)

(72) Inventors: Ryuhei Kurokawa, Ichihara (JP); Masashi Kunishige, Ichihara (JP); Shinya Gibo, Ichihara (JP)

(73) Assignee: DIC Corporation, Tokyo (JP)

( * ) Notice: Subject to any disclaimer, the term of this patent is extended or adjusted under 35 U.S.C. 154(b) by 314 days.

(21) Appl. No.: 18/245,542

(22) PCT Filed: Sep. 28, 2021

(86) PCT No.: PCT/JP2021/035715
§ 371 (c)(1),
(2) Date: Mar. 16, 2023

(87) PCT Pub. No.: WO2022/075124
PCT Pub. Date: Apr. 14, 2022

(65) Prior Publication Data
US 2023/0364836 A1  Nov. 16, 2023

(30) Foreign Application Priority Data
Oct. 5, 2020 (JP) .................. 2020-168720

(51) Int. Cl.
*B29C 45/44* (2006.01)
*B29C 45/00* (2006.01)
(Continued)

(52) U.S. Cl.
CPC .......... *B29C 45/0005* (2013.01); *B29C 45/44* (2013.01); *C08K 7/14* (2013.01); *B29K 2081/04* (2013.01); *B29K 2105/12* (2013.01)

(58) Field of Classification Search
None
See application file for complete search history.

(56) References Cited

FOREIGN PATENT DOCUMENTS

JP    S-59 220 321 A  * 12/1984
JP    H-07 521 67 A   *  2/1995
(Continued)

OTHER PUBLICATIONS

Mar. 28, 2023, International Preliminary Report on Patentability issued in the International Patent Application No. PCT/JP2021/035715.
(Continued)

*Primary Examiner* — Mohammad M Ameen
(74) *Attorney, Agent, or Firm* — KENJA IP LAW PC

(57) ABSTRACT

A forced extraction molded article that can prevent damage during forced extraction is provided. The force extraction molded article (1) is formed of a polyarylene sulfide resin composition so as to include a cylindrical portion, wherein the cylindrical portion (10) has at a forward end portion a bulge (11), and an inner surface including a step in the outer diameter direction at the forward end portion, a portion excluding the step has a gradient such that the inner diameter of the cylindrical portion increases toward the forward end portion, and equation (a) below using a thickness D2 between a connection portion at the step on the inner surface of the cylindrical portion and the outer surface excluding the bulge, a height D4 of the step, and a height Dt of the gradient excluding the step on the inner surface of the cylindrical portion is satisfied.

[Equation 1]

$$0.001 \leq \frac{\frac{D2}{2} - D4}{D2} \times \frac{Dt}{D2} \leq 0.44 \quad \text{Equation (a)}$$

5 Claims, 3 Drawing Sheets

(51) Int. Cl.
*C08K 7/14* (2006.01)
*B29K 81/00* (2006.01)
*B29K 105/12* (2006.01)

(56) References Cited

FOREIGN PATENT DOCUMENTS

| JP | 2011161655 A | 8/2011 |
|----|--------------|--------|
| JP | 2018141083 A | 9/2018 |
| WO | 2019045032 A1 | 3/2019 |

OTHER PUBLICATIONS

Nov. 16, 2021, International Search Report issued in the International Patent Application No. PCT/JP2021/035715.
Jun. 1, 2023, Office Action issued by the China National Intellectual Property Administration in the corresponding Chinese Patent Application No. 202180062079.9.

* cited by examiner

FORCED EXTRACTION MOLDED ARTICLE, POLYARYLENE SULFIDE RESIN COMPOSITION, AND METHOD FOR PRODUCING FORCED EXTRACTION MOLDED ARTICLE

TECHNICAL FIELD

The present disclosure relates to a forced extraction molded article, a polyarylene sulfide resin composition, and a method for producing a forced extraction molded article.

BACKGROUND

In recent years, an engineering plastic having excellent productivity and moldability and high heat resistance has been developed. Since the engineering plastic is lightweight, the engineering plastic is widely used instead of a metal material for electric and electronic apparatuses and members of automobiles. In particular, a polyarylene sulfide (hereinafter abbreviated as PAS) resin typified by a polyphenylene sulfide (hereinafter abbreviated as PPS) resin has high heat resistance and excellent mechanical strength, chemical resistance, molding processability, and dimensional stability. By using the characteristics of PAS, PAS is used as materials for parts of electric and electronic apparatuses, parts of automobiles, and the like.

The PAS resin is often used as a material for a part having a complex shape. When the part having a complex shape consists of a plurality of members in combination, the number of the members is large. Therefore, integral molding is required for the part. For example, in integral molding of a piping part having a bulge at a forward end portion, or the like, forced extraction molding may be performed. In the forced extraction molding, a mold is drawn in an axial direction over a bulge of a molded article. Thus, the bulge of the molded article needs to be deformed inwardly (ideally, elastically deformed).

In this regard, PTL 1 discloses a resin composition for a forced extraction molded article that has a defined bending modulus and thus prevents deformation from being left in a molded article obtained by forced extraction molding.

PTL 2 discloses a resin composition in which when a predetermined equation about a bending modulus and a tensile strength is satisfied, forced extraction can be performed for a resin injection molded article having a cylindrical bulge having a sufficient undercut ratio.

PTL 3 discloses a resin injection molded article that can prevent a circular protrusion from being damaged during forced extraction when a thinned portion is formed on a predetermined portion in a circumferential direction of the circular protrusion.

CITATION LIST

Patent Literatures

PTL 1: International Publication WO2019/045032
PTL 2: Japanese Unexamined Patent Application No. 2018-141083
PTL 3: Japanese Unexamined Patent Application No. 2011-161655

SUMMARY

Technical Problems

A cylindrical forced extraction molded article having a bulge may have a step on an inner surface of a forward end portion. It is empirically known that the shape of the step affects damage during forced extraction. In particular, in a case of a PAS resin composition in which a PAS resin is mixed with a fibrous filler, it is known that the generation of damage during forced extraction varies depending on the shape of the step although the undercut ratios are the same. PTLs 1 to 3 do not describe the effect of the shape of such a step. An indication regarding the shape of the step that can prevent damage during forced extraction is required.

The present disclosure has been made in view of the circumstances, and an object of the present disclosure is to provide a forced extraction molded article that can prevent damage during forced extraction, a polyarylene sulfide resin composition used for the forced extraction molded article, and a method for producing the forced extraction molded article.

Solution to Problems

A forced extraction molded article according to an embodiment of the present disclosure is formed of a polyarylene sulfide resin composition in which a polyarylene sulfide resin is mixed with a fibrous filler so as to include a cylindrical portion, wherein the cylindrical portion has at a forward end portion a bulge that has an undercut shape and is projected in an outer diameter direction, and an inner surface including a step in the outer diameter direction at the forward end portion, a portion excluding the step has a gradient such that the inner diameter of the cylindrical portion increases toward the forward end portion, and equation (a) below using a thickness D2 between a connection portion at the step on the inner surface of the cylindrical portion and the outer surface excluding the bulge, a height D4 of the step, and a height Dt of the gradient excluding the step on the inner surface of the cylindrical portion is satisfied.

[Equation 1]

$$0.001 \leq \frac{\frac{D2}{2} - D4}{D2} \times \frac{Dt}{D2} \leq 0.44 \qquad \text{Equation (a)}$$

A polyarylene sulfide resin composition according to an embodiment of the present disclosure is exclusively used for the forced extraction molded article and obtained by mixing a polyarylene sulfide resin with a fibrous filler.

By a method for producing a forced extraction molded article according to an embodiment of the present disclosure, the forced extraction molded article is produced.

Advantageous Effects

The present disclosure can provide a forced extraction molded article that can prevent damage during forced extraction, a polyarylene sulfide resin composition used for the forced extraction molded article, and a method for producing the forced extraction molded article.

BRIEF DESCRIPTION OF THE DRAWINGS

In the accompanying drawings.

DETAILED DESCRIPTION (Forced Extraction Molded Article)

Figure 1:
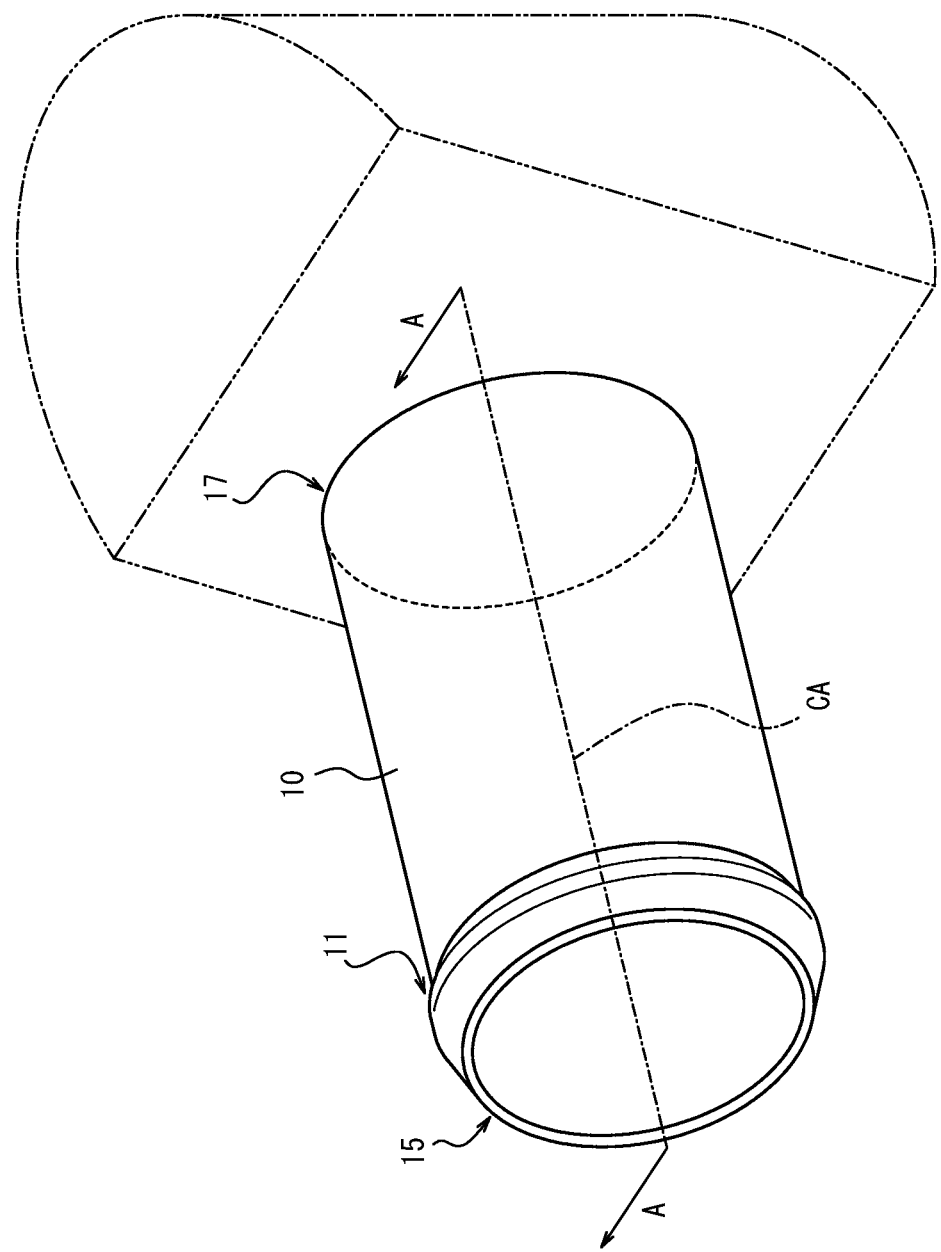
FIG. 1 is a perspective view of a major portion of a forced extraction molded article according to an embodiment of the present disclosure.

A forced extraction molded article 1 according to an embodiment of the present disclosure will be described below with reference to the drawings. In the drawings used in the following description, the shape and size relationship of illustrated components may differ from the shape and size relationship in an actual forced extraction molded article 1.

Figure 2:
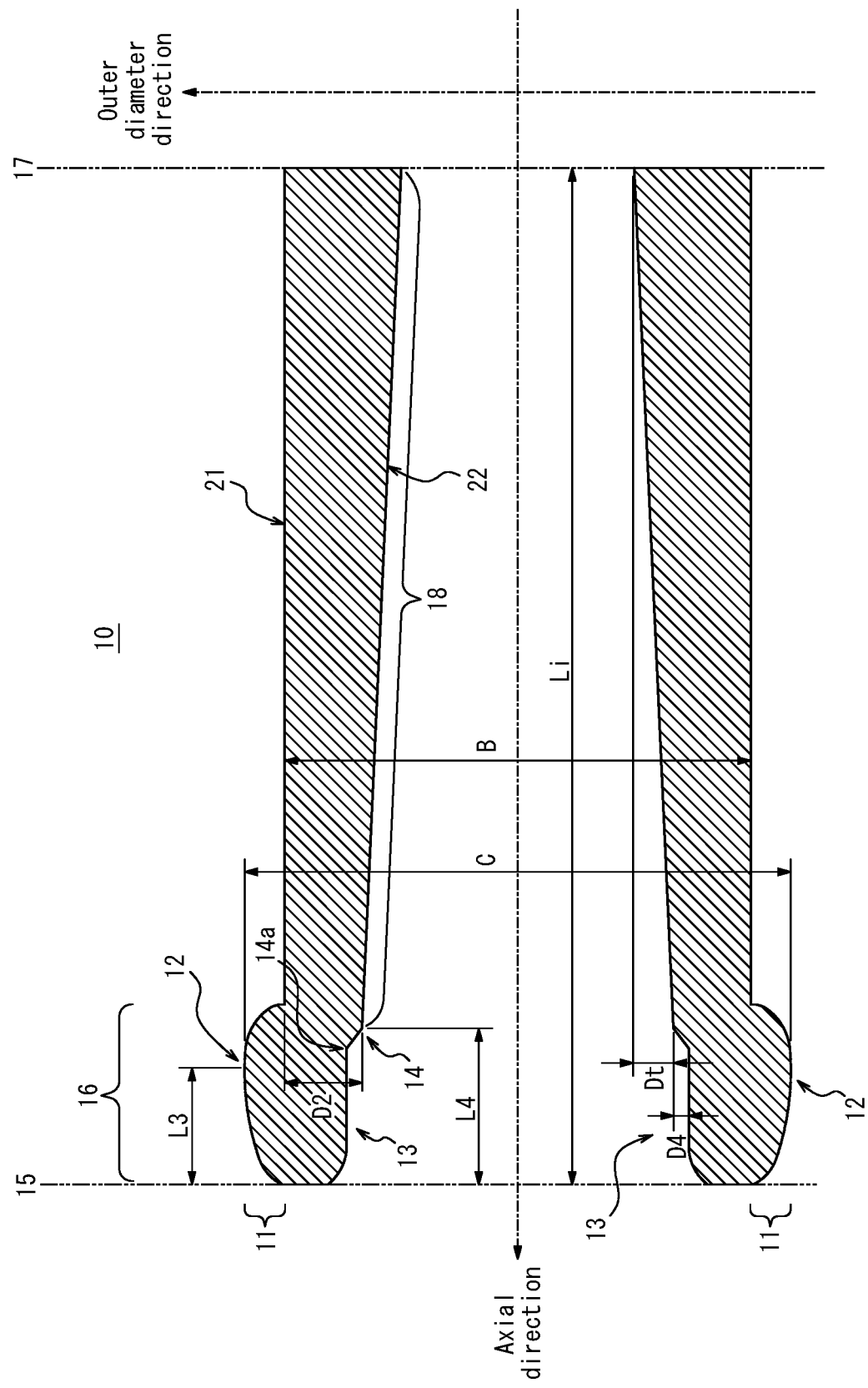
FIG. 2 is a cross-sectional view of the major portion of the forced extraction molded article in FIG. 1.
Figure 3:
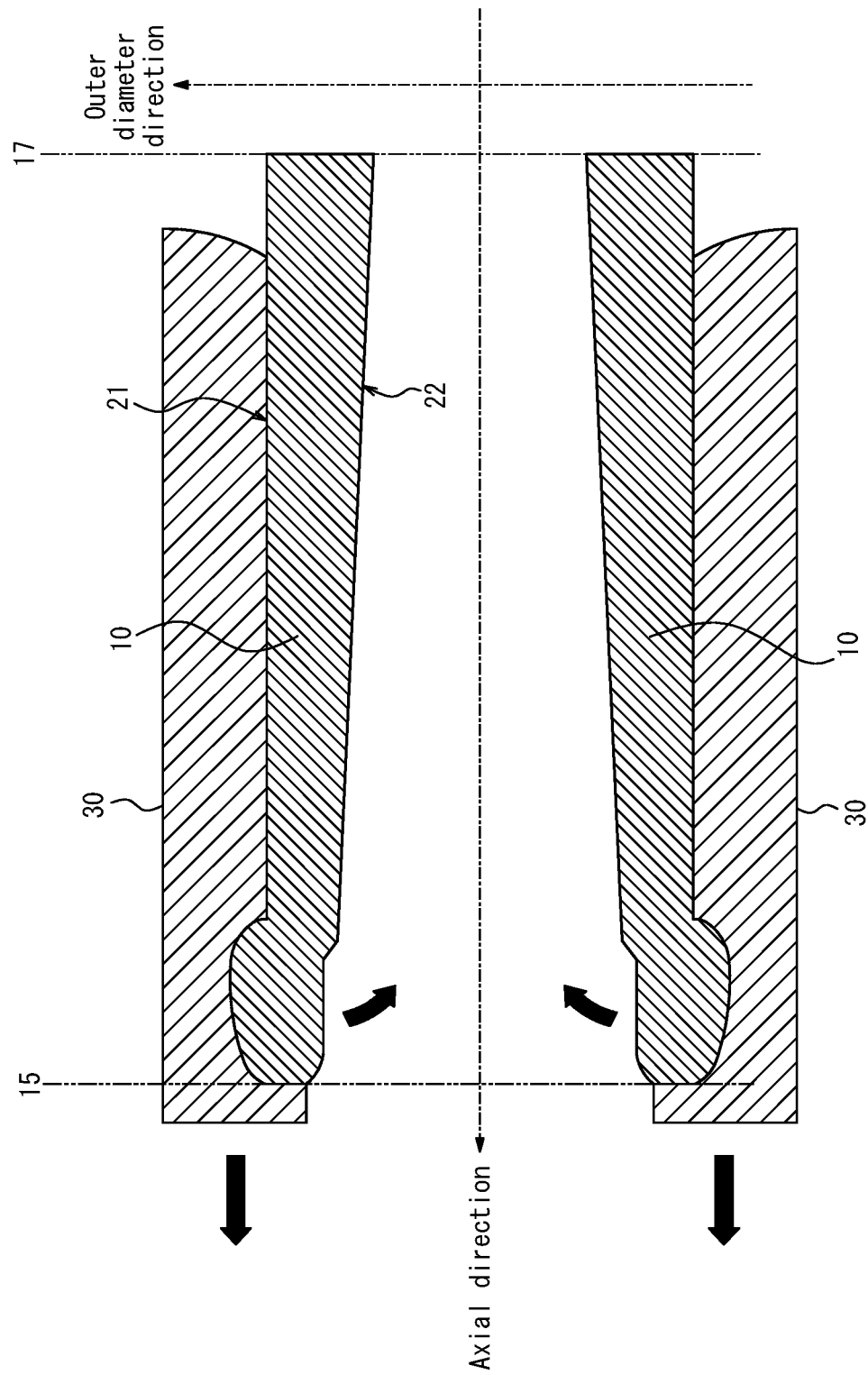
FIG. 3 is a view illustrating forced extraction of the forced extraction molded article in FIG. 1.

FIG. 1 is a perspective view of a major portion of the forced extraction molded article 1 according to the present embodiment. In the present embodiment, the major portion of the forced extraction molded article 1 includes a cylindrical portion 10 having a bulge 11. FIG. 2 is a cross-sectional view taken along line A-A of the forced extraction molded article 1 in FIG. 1. The forced extraction molded article 1 is obtained by injection molding a polyarylene sulfide (PAS) resin composition and performing forced extraction during mold release. FIG. 3 is a view illustrating the forced extraction of the forced extraction molded article 1 in FIG. 1. Herein, the forced extraction is a molding method in which a mold 30 is drawn in an axial direction over the bulge 11 of the molded article. The PAS resin composition is a composition obtained by mixing a PAS resin with a fibrous filler. Details of the PAS resin will be described later.

In the present embodiment, the cylindrical portion 10 of the forced extraction molded article 1 has the bulge 11 that has an undercut shape and is projected in an outer diameter direction at a portion (forward end portion 16) within a constant range in the axial direction from a forward end 15. Herein, the cylindrical portion 10 has a cylindrical shape having two circular bottoms that each have a center on an axis CA and are opened. In other words, the cylindrical portion has a hollow pipe shape in which the forward end 15 and a backward end 17 are opened. The outer diameter direction is a direction perpendicular to the axial direction that is along the axis CA. The outer diameter direction is a direction from the axis CA toward the side surface.

As illustrated in FIG. 1, the backward end 17 of the cylindrical portion 10 may be connected to any portion of the forced extraction molded article 1. That is, the backward end 17 of the cylindrical portion 10 is at the farthest position from the forward end 15 in the axial direction such that the cross section is a circle having a center on the axis CA. Herein, the shape of the cylindrical portion 10 is symmetric about the axis CA. For example, two cross sections of the cylindrical portion 10 illustrated in FIG. 2 are vertically symmetric about the axis CA.

As illustrated in FIG. 2, an outer surface 21 of the cylindrical portion 10 reaches the forward end portion 16 and extends in the axial direction from the backward end 17 toward the forward end 15. At the forward end portion 16, the outer surface 21 is connected to the bulge 11 in which a top 12 is the most convex in the outer diameter direction.

An inner surface 22 of the cylindrical portion 10 has a step 13 in the outer diameter direction at the forward end portion 16. A portion excluding the step 13 on the inner surface 22 of the cylindrical portion 10 has a gradient such that the inner diameter of the cylindrical portion 10 increases from the backward end 17 toward the forward end portion 16. In the present embodiment, the gradient is constant. The portion excluding the step 13 on the inner surface 22 of the cylindrical portion 10 is connected to the step 13 at a connection portion 14. Herein, a slope 18 illustrated in FIG. 2 is a portion having a constant gradient from the backward end 17 toward the forward end portion 16, that is, the portion excluding the step 13 on the inner surface 22 of the cylindrical portion 10. The connection portion 14 is positioned at an end of the slope 18 on the forward end 15 side.

As illustrated in FIG. 3, the cylindrical portion 10 having the bulge 11 is formed by forced extraction. During mold release, the mold 30 is drawn in the axial direction from the backward end 17 toward the forward end portion 16. At that time, a force from the mold 30 is applied to the bulge 11, and thus the forward end portion 16 is bent at a corner 14a of the step 13 as a fulcrum toward the axis CA.

For example, the shape of the step 13 such as the height (depth) of the step 13 and the thickness until the outer surface 21 of the connection portion 14 affects damage during forced extraction. It is known that the generation of damage during forced extraction of the forced extraction molded article 1 formed of the PAS resin composition varies depending on the shape of the step 13 although the undercut ratios are the same. The present inventors have intensively studied, and as a result, found that when a parameter about the shape of the step 13 satisfies an equation below, damage during forced extraction can be prevented.

When the following parameter P1 about the height of the step 13 in the forced extraction molded article 1 having the cylindrical portion 10 is within a certain range, damage during forced extraction can be prevented.

$$P1 = \frac{\frac{D2}{2} - D4}{D2} \times \frac{Dt}{D2} \quad \text{[Equation 2]}$$

A thickness D2 in the parameter P1 is the thickness from the outer surface 21 of the cylindrical portion 10 to the step 13. As illustrated in FIG. 2, the measurement position of the step 13 is the connection portion 14 that is a boundary between the step 13 and the slope 18. As illustrated in FIG. 2, the measurement position of the outer surface 21 is a portion in which the portion excluding the bulge 11 extends in the axial direction. In other words, the thickness D2 is the distance between the connection portion 14 to the step 13 on the inner surface 22 of the cylindrical portion 10 and the outer surface 21 excluding the bulge 11.

A height D4 in the parameter P1 is the height of the step 13 in the outer diameter direction. The height of the step 13 may be, for example, the distance in the outer diameter direction between the connection portion 14 and a flat portion of the step 13 in the axial direction.

A gradient height Dt in the parameter P1 is the height of the portion excluding 13 on the inner surface 22 of the cylindrical portion 10 in the outer diameter direction based on the gradient. As illustrated in FIG. 2, the gradient height Dt is the distance in the outer diameter direction between a portion of the slope 18 at the backward end 17 and the connection portion 14.

In order to obtain rigidity, it is preferable that the height D4 be low. That is, when the height D4 is high, deformation caused by forced extraction may be increased due to a decrease in rigidity although damage is actually generated. Therefore, it is considered that the height D4 needs to be lower than at least a half of the thickness D2. Thus, the parameter P1 contains a first evaluation value "((D2/2)−D4)/

D2". From the viewpoint of preventing a decrease in rigidity, the first evaluation value that is a positive value is required.

When the forward end portion 16 is easily bent during forced extraction, damage is unlikely to be generated. When the gradient height Dt is high, the forward end portion 16 is easily bent. However, when the gradient height Dt is too high, the strength of the forward end portion 16 is low. Therefore, the gradient height Dt needs to be set within a certain range. Thus, the parameter P1 contains a second evaluation value "Dt/D2". From the viewpoint of ease of bending the forward end portion 16 and preventing a decrease in rigidity, the second evaluation value within the certain range is required.

Herein, the first and second evaluation values are defined as a ratio of the thickness D2 so as to be applicable to various thicknesses of the cylindrical portion 10.

The parameter P1 is obtained by multiplying the first evaluation value by the second evaluation value. Since the minimum value of the parameter P1 contains the first evaluation value, the minimum value is at least a positive value. In consideration of the second evaluation value, the gradient height Dt that is 1/100 or less of the thickness D2 actually corresponds to a state where there is no step 13. Therefore, the minimum value of the parameter P1 about the height of the step 13 may be 0.001.

Since the first evaluation value is a value in which the height D4 is 0 or more, the first evaluation value is up to 0.5. The gradient height Dt related to the second evaluation value is equal to or less than at least the thickness D2. Therefore, the maximum value of the parameter P1 is at least 0.5 or less. In consideration of the strength of the step 13, it is impossible that the gradient height Dt is higher than a half of the thickness D2. In consideration of Examples and the like described below, it is preferable that the maximum value of the parameter P1 be set to a value less than 0.5. In the present embodiment, the maximum value of the parameter P1 is 0.44.

As investigated above, when the following equation (a) about the height of the step 13 is satisfied, damage during forced extraction can be prevented.

[Equation 3]

$$0.001 \le \frac{\frac{D2}{2} - D4}{D2} \times \frac{Dt}{D2} \le 0.44 \qquad \text{Equation (a)}$$

The position of the step 13 in the axial direction affects ease of bending the forward end portion 16. When a parameter P2 about the position of the step 13 in the forced extraction molded article 1 having the cylindrical portion 10 is within a certain range, the effect of preventing damage during forced extraction can be enhanced.

$$P2 = \frac{L4 - L3}{Li} \times \frac{L4}{Li} \qquad \text{[Equation 4]}$$

A length Li in the parameter P2 is the length of the cylindrical portion 10 in the axial direction. As illustrated in FIG. 2, the length Li is the distance between the forward end 15 and the backward end 17.

As illustrated in FIG. 2, a distance L3 in the parameter P2 is the distance in the axial direction between the forward end 15 of the cylindrical portion 10 and the top 12 of the bulge 11.

As illustrated in FIG. 2, a distance L4 in the parameter P2 is the distance in the axial direction between the forward end 15 of the cylindrical portion 10 and the connection portion 14 to the step 13 on the inner surface 22.

In terms of a relationship between the distances L3 and L4, the distance L4 is preferably larger than the distance L3. This is because the forward end portion 16 is easily bent at the connection portion 14 as a fulcrum toward the axis CA when the force from the mold 30 is applied to the bulge 11. Thus, the parameter P2 contains a third evaluation value "(L4−L3)/Li". In order to relax a stress in the axial direction, the third evaluation value that is a positive value or a value close to zero although being a negative value is required.

In order to make the forward end portion 16 rigid, it is preferable that the distance L4 be small. Thus, the parameter P2 contains a fourth evaluation value "L4/Li". As described above, the distance L4 that is larger than the distance L3 is required. From the viewpoint of preventing a decrease in rigidity and relaxing the stress, the fourth evaluation value within the certain range is required.

Herein, the third and fourth evaluation values are defined as a ratio of the length Li so as to be applicable to various lengths of the cylindrical portion 10.

The parameter P2 is obtained by multiplying the third evaluation value by the fourth evaluation value. Since the minimum value of the parameter P2 contains the third evaluation value, the minimum value is a positive value or a value close to zero although being a negative value. Herein, it is preferable that the minimum value be defined as a negative value when the shape of the usable bulge 11 is not limited. In the present embodiment, the minimum value of the parameter P2 is −0.001.

Since the top 12 is positioned near the forward end 15, "L3/Li" is sufficiently small, and the top 12 hardly affects determination of the maximum value of the parameter P2. Therefore, the maximum value of the parameter P2 may be set in consideration of the fourth evaluation value. For the fourth evaluation value, the distance L4 is equal to or less than at least the length Li. A structure in which the connection portion 14 is positioned at the backward end 17 is difficult in fact. In consideration of Examples and the like described below, the maximum value of the parameter P2 is set to a value less than 1. In the present embodiment, the maximum value of the parameter P2 is 0.46.

As investigated above, when the following equation (b) about the position of the step 13 in the axial direction is satisfied, the effect of preventing damage during forced extraction can be enhanced.

[Equation 5]

$$-0.001 \le \frac{L4 - L3}{Li} \times \frac{L4}{Li} \le 0.46 \qquad \text{Equation (b)}$$

Herein, equations (a) and (b) are indications that do not depend on the undercut ratio. In the present embodiment, the value of the undercut ratio is not limited. Therefore, in the present embodiment, the value of the undercut ratio is not limited. From the viewpoint of preventing poor deformation such as damage caused by elastic deformation of the bulge 11 during forced extraction molding, the undercut ratio may be preferably 20% or less, and more preferably 14% or less. From the viewpoint of preventing the bulge 11 from slipping during insertion into a flexible tube or pipe, or the like, the undercut ratio may be preferably 5% or more, and more preferably 3.5% or more. For example, in Examples described below, the undercut ratio is 5.3%.

Herein, the undercut ratio is defined by the following equation (c).

[Equation 6]

$$\frac{|C-B|}{C} \times 100(\%) \qquad \text{Equation (c)}$$

In equation (c), an outer diameter C is the outer diameter of the cylindrical portion 10 at the top 12 of the bulge 11, as illustrated in FIG. 2.

In equation (c), an outer diameter B is the outer diameter of the cylindrical portion 10 excluding the bulge 11, as illustrated in FIG. 2.

(PAS Resin Composition)

The aforementioned forced extraction molded article 1 is formed of the PAS resin composition in which a PAS resin is mixed with a fibrous filler. A resin composition described below (the PAS resin composition of the present disclosure) is exclusively used for the forced extraction molded article 1.

The PAS resin composition of the present disclosure contains a PAS resin as an essential component. The PAS resin has a resin structure containing as a repeating unit a structure in which an aromatic ring is bonded to a sulfur atom. Specifically, the PAS resin composition is a resin containing a structural moiety represented by the following general formula (1):

[Formula 1]

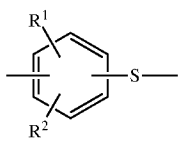

Formula (1)

(wherein $R^1$ and $R^2$ are each independently a hydrogen atom, an alkyl group having 1 to 4 carbon atoms, a nitro group, an amino group, a phenyl group, a methoxy group, or an ethoxy group), and if necessary, a trifunctional structural moiety represented by the following general formula (2):

[Formula 2]

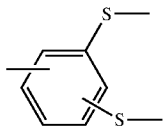

Formula (2)

as repeating units. The amount of the trifunctional structural moiety represented by formula (2) is preferably 0.001% by mole or more, and more preferably 0.01% by mole or more, and preferably 3% by mole or less, more preferably 1% by mole or less, relative to the total number of moles of this structural moiety and other structural moieties.

Herein, the structural moiety represented by formula (1), especially $R^1$ and $R^2$ in the formula are preferably a hydrogen atom in terms of mechanical strength of the PAS resin. In this case, examples of the structural moiety include a structural moiety represented by the following formula (3) and having bonds at para positions and a structural moiety represented by the following formula (4) and having bonds at meta positions.

[Formula 3]

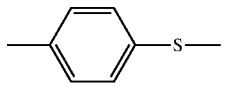

Formula (3)

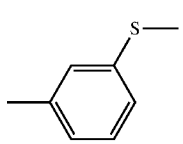

Formula (4)

In particular, the structural moiety represented by the general formula (3) in which a bond of the aromatic ring to the sulfur atom in the repeating unit is a bond at a para position is preferred in terms of heat resistance and crystallinity of the PAS resin.

The PAS resin may contain not only the structural moieties represented by formulae (1) and (2), but also structural moieties represented by the following structural formulae (5) to (8):

[Formula 4]

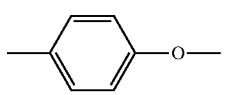

Formula (5)

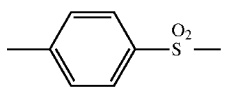

Formula (6)

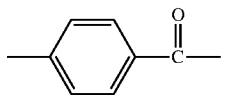

Formula (7)

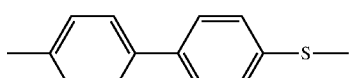

Formula (8)

in an amount of 30% by mole or less relative to the total amount of the structural moieties represented by formulae (1) and (2). In particular, it is preferable that the amount of the structural moieties represented by formulae (5) to (8) be 10% by mole or less in terms of heat resistance and mechanical strength of the PAS resin. When the PAS resin contains the structural moieties represented by the general formulae (5) to (8), the structural moieties may be bonded at any pattern to form any of a random copolymer or a block copolymer.

The molecular structure of the PAS resin may have a naphthyl sulfide bond and the like, and the amount thereof is preferably 3% by mole or less, and particularly preferably 1% by mole or less, relative to the total amount of the molecular structure and another structural moiety.

The physical properties of the PAS resin are not particularly limited as long as they do not impair the effects of the present disclosure, and are as described below.

(Melt Viscosity)

The melt viscosity of the PAS resin is not particularly limited. The melt viscosity (V6) measured at 300° C. is preferably 2 Pa·s or more, and preferably 1,000 Pa·s or less, more preferably 500 Pa·s or less, and further preferably 200 Pa·s or less since flowability and mechanical strength are well balanced. In the measurement of the melt viscosity (V6), a flow tester CFT-500D manufactured by Shimadzu Corporation is used for the PAS resin. The melt viscosity is a value measured after the PAS resin is held at 300° C., a load of $1.96 \times 10^6$ Pa, and L/D of 10 (mm)/1 (mm) for 6 minutes.

(Non-Newtonian Index)

The non-Newtonian index of the PAS resin is not particularly limited, and is preferably within the range of 0.90 or more and 2.00 or less. When a linear PAS resin is used, the non-Newtonian index is preferably 0.90 or more, and more preferably 0.95 or more, and preferably 1.50 or less, and more preferably 1.20 or less. Such a PAS resin has excellent mechanical physical properties, flowability, and abrasion resistance. The non-Newtonian index (N value) is a value calculated by the following equation from a shear rate (SR) and a shear stress (SS) that are measured using Capilograph under conditions of a melting point plus 20° C. and a ratio L/D of an orifice length (L) to an orifice diameter (D) of 40. As the non-Newtonian index (N value) is closer to 1, the structure is closer to a linear shape. As the non-Newtonian index (N value) is higher, the structure is more branched.

$$SR = K \cdot SS^N \qquad \text{[Equation 7]}$$

In this equation, SR represents a shear rate ($S^{-1}$). SS represents a shear stress ($dyn/cm^2$). K is a constant.

(Method for Producing PAS Resin)

A method for producing the PAS resin is not particularly limited, and examples thereof include: (method 1) a method in which a dihaloaromatic compound, and if necessary, a polyhaloaromatic compound or another copolymerization component are polymerized in the presence of sulfur and sodium carbonate; (method 2) a method in which a dihaloaromatic compound, and if necessary, a polyhaloaromatic compound or another copolymerization component are polymerized in a polar solvent in the presence of sulfide-forming agent and the like; and (method 3) a method for self-condensing p-chlorothiophenol, with another copolymerization component if necessary. Among these methods, the method 2 is preferred since it is widely used. During a reaction, an alkali metal salt of carboxylic acid or sulfonic acid, or an alkali hydroxide may be added to adjust the degree of polymerization. In the method 2, it is particularly preferable that the PAS resin be obtained by a method in which a water-containing sulfide-forming agent is introduced into a mixture containing a heated organic polar solvent and a dihaloaromatic compound at a speed at which water can be removed from a reaction mixture, and if necessary, a polyhaloaromatic compound is added, the dihaloaromatic compound and the sulfide-forming agent are reacted in the organic polar solvent, and the amount of water in the reaction system is controlled within the range of 0.02 to 0.5 moles relative to 1 mole of the organic polar solvent to produce the PAS resin (see Japanese Unexamined Patent Application No. H07-228699). Furthermore, it is particularly preferable that the PAS resin be obtained by a method in which a dihaloaromatic compound, and if necessary, a polyhaloaromatic compound or another copolymerization component are reacted with an alkali metal hydrosulfide and an alkali metal salt of an organic acid in the presence of a solid alkali metal sulfide and an aprotic polar organic solvent while the amount of the alkali metal salt of an organic acid is controlled within the range of 0.01 to 0.9 moles relative to 1 mole of sulfur source and the amount of water in the reaction system is controlled to be 0.02 moles or less relative to 1 mole of the aprotic polar organic solvent (see WO2010/058713). Specific examples of the dihaloaromatic compound include p-dihalobenzene, m-dihalobenzene, o-dihalobenzene, 2,5-dihalotoluene, 1,4-dihalonaphthalene, 1-methoxy-2,5-dihalobenzene, 4,4'-dihalobiphenyl, 3,5-dihalobenzoic acid, 2,4-dihalobenzoic acid, 2,5-dihalonitrobenzene, 2,4-dihalonitrobenzene, 2,4-dihaloanisole, p,p'-dihalodiphenyl ether, 4,4'-dihalobenzophenone, 4,4',-dihalodiphenyl sulfone, 4,4',-dihalodiphenyl sulfoxide, 4,4'-dihalodiphenyl sulfide, and compounds having an alkyl group having 1 to 18 carbon atom on the aromatic ring of any of the aforementioned compounds. Examples of the polyhaloaromatic compound include 1,2,3-trihalobenzene, 1,2,4-trihalobenzene, 1,3,5-trihalobenzene, 1,2,3,5-tetrahalobenzene, 1,2,4,5-tetrahalobenzene, and 1,4,6-trihalonaphthalene. A halogen atom contained in the aforementioned compounds is desirably a chlorine atom or a bromine atom.

A method for post-treating a reaction mixture containing the PAS resin obtained by a polymerization process is not particularly limited. Examples thereof include: (post-treatment 1) a method in which after completion of a polymerization reaction, a solvent is distilled off under reduced pressure or normal pressure from the reaction mixture as it is or after addition of an acid or a base, a solid material after distillation of the solvent is washed with a solvent such as water, the reaction solvent (or an organic solvent having the same solubility in a low molecular weight polymer), acetone, methyl ethyl ketone, and an alcohol, one or two or more times, followed by neutralization, water-washing, filtration, and drying. Examples thereof include (post-treatment 2) a method in which after completion of a polymerization reaction, a solvent (a solvent that is soluble in the solvent used for polymerization and is a poor solvent to at least PAS) such as water, acetone, methyl ethyl ketone, an alcohol, an ether, a halogenated hydrocarbon, an aromatic hydrocarbon, and an aliphatic hydrocarbon is added as a precipitating agent, to precipitate a solid product such as PAS and an inorganic salt, and the solid product is filtered off, washed, and dried. Examples thereof include (post-treatment 3) a method in which after completion of a polymerization reaction, a reaction solvent (or an organic solvent having the same solubility in a low molecular weight polymer) is added to the reaction mixture and then stirred, the low molecular weight polymer is removed by filtration, and the resultant is washed with a solvent such as water, acetone, methyl ethyl ketone, and an alcohol one or two or more times, followed by neutralization, water-washing, filtration, and drying. Examples thereof include (post-treatment 4) a method in which after completion of a polymerization reaction, water is added to wash the reaction mixture, and if necessary, an acid is added to treat the reaction mixture during water-washing, followed by filtration and drying. Examples thereof include (post-treatment 5) a method in which after completion of a polymerization reaction, the reaction mixture is filtered, and if necessary, washed one or two or times with the reaction solvent, and then with water, followed by filtration and drying.

In the post-treatment method described in the post-treatments 1 to 5, the PAS resin may be dried in vacuum, in an air, or in an inert gas atmosphere such as nitrogen.

The PAS resin composition contains the fibrous filler as an essential component. Since the fibrous filler is mixed, a more excellent molded article is obtained in terms of holding mechanical strength. Examples of the fibrous filler include a glass fiber, a carbon fiber, a silane glass fiber, a ceramic fiber, an aramid fiber, and a metal fiber. One or two or more types of the fibrous fillers can be mixed.

The amount of the fibrous filler mixed is preferably 1 part by mass or more, more preferably 5 parts by mass or more, and further preferably 15 parts by mass or more, and preferably 300 parts by mass or less, more preferably 200 parts by mass or less, and further preferably 150 parts by mass or less, relative to 100 parts by mass of the PAS resin. When the amount of the fibrous filler mixed is within this range, a more excellent effect is obtained in terms of holding the mechanical strength of the molded article.

The fibrous filler that is processed with a surface treatment agent or a sizing agent can be used. This is preferred since the adhesion force to the PAS resin can be enhanced. Examples of the surface treatment agent or the sizing agent include at least one type of polymer selected from the group consisting of a silane compound, a titanate compound, an acrylic resin, a urethane resin, and an epoxy resin having a functional group, such as an amino group, an epoxy group, an isocyanate group, or a vinyl group.

The PAS resin composition may contain as an optional component a filler excluding the fibrous filler (hereinafter referred to as "other filler"), if necessary. As the other filler, a commonly known material can be used as long as it impairs the effects of the present disclosure. Examples thereof include a granular filler, a plate-like filler, and fillers having various shapes. A nonfibrous filler, such as a glass bead, a glass flake, barium sulfate, clay, pyrophyllite, bentonite, sericite, mica, mica, talc, attapulgite, ferrite, calcium silicate, calcium carbonate, zeolite, a milled fiber, or calcium sulfate can be used.

In the present disclosure, the other filler is not an essential component. When the other filler is mixed, the amount of the other filler mixed is not particularly limited as long as it does not impair the effects of the present disclosure. The amount of the other filler mixed is preferably 1 part by mass or more, and more preferably 10 parts by mass or more, and preferably 600 parts by mass or less, and more preferably 200 parts by mass or less, relative to 100 parts by mass of the PAS resin. When it is within such a rage, the resin composition exhibits favorable mechanical strength and moldability. Therefore, this is preferred.

The PAS resin composition may contain as the optional component a silane-coupling agent, if necessary. The silane-coupling agent for a PAS resin is not particularly limited as long as it does not impair the effects of the present disclosure. Preferable examples of the silane-coupling agent include a silane-coupling agent having a functional group to be reacted with a carboxy group, such as an epoxy group, an isocyanato group, an amino group, or a hydroxyl group. Examples of such a silane-coupling agent include an epoxy group-containing alkoxysilane compound, such as γ-glycidoxypropyltrimethoxysilane, γ-glycidoxypropyltriethoxysilane, and β-(3,4-epoxycyclohexyl)ethyltrimethoxysilane, an isocyanato group-containing alkoxysilane compound, such as γ-isocyanatepropyltrimethoxysilane, γ-isocyanatepropyltriethoxysilane, γ-isocyanatepropylmethyldimethoxysilane, γ-isocyanatepropylmethyldiethoxysilane, γ-isocyanatepropylethyldimethoxysilane, γ-isocyanatepropylethyldiethoxysilane, and γ-isopropyltrichlorosilane, an amino group-containing alkoxysilane compound, such as γ-(2-aminoethyl)aminopropylmethyldiethoxysilane, γ-(2-aminoethyl)aminopropyltrimethoxysilane, and γ-aminopropyltrimethoxysilane, and a hydroxyl group-containing alkoxysilane compound, such as γ-hydroxypropyltrimethoxysilane, and γ-hydroxypropyltriethoxysilane. The silane-coupling agent is not an essential component. When the silane-coupling agent is mixed, the amount of the silane-coupling agent mixed is not particularly limited as long as it does not impair the effects of the present disclosure. The amount of the silane-coupling agent mixed is preferably 0.01 parts by mass or more, and more preferably 0.1 parts by mass or more, and preferably 10 parts by mass or less, and more preferably 5 parts by mass or less, relative to 100 parts by mass of the PAS resin. When it is within such a range, the resin composition has favorable corona resistance and moldability, and especially mold releasability, and the molded article exhibits excellent adhesive properties to the epoxy resin and further improved mechanical strength. Therefore, this is preferred.

The PAS resin composition may contain as the optional component a thermoplastic elastomer, if necessary. Examples of the thermoplastic elastomer include a polyolefin-based elastomer, a fluorine-containing elastomer, and a silicone-based elastomer. Among these, a polyolefin-based elastomer is preferred. When the elastomer is added, the amount of the elastomer is not particularly limited as long as it does not impair the effects of the present disclosure. The amount of the elastomer mixed is preferably 0.01 parts by mass or more, and more preferably 0.1 parts by mass or more, and preferably 10 parts by mass or less, and more preferably 5 parts by mass or less, relative to 100 parts by mass of the PAS resin. When it is within such a rage, the impact resistance of the obtained PAS resin composition is improved. Therefore, this is preferred.

Examples of the polyolefin-based elastomer include a homopolymer of α-olefin, a copolymer of two or more α-olefins, and a copolymer of one or two or more α-olefins with a vinyl polymerizable compound having a functional group. Examples of the α-olefins include α-olefins having 2 or more and 8 or less carbon atoms, such as ethylene, propylene, and 1-butene. Examples of the functional group include a carboxy group, an acid anhydride group (—C(═O)OC(═O)—), an epoxy group, an amino group, a hydroxyl group, a mercapto group, an isocyanate group, and an oxazoline group. Examples of the vinyl polymerizable compound having the functional group include one or two or more of vinyl acetate; an α,β-unsaturated carboxylic acid, such as (meth)acrylic acid; an alkyl ester of an α,β-unsaturated carboxylic acid, such as methyl acrylate, ethyl acrylate, and butyl acrylate; a metal salt of an α,β-unsaturated carboxylic acid, such as an ionomer (in which the metal is an alkali metal such as sodium, an alkaline earth metal such as calcium, zinc, or the like); a glycidyl ester of an α,β-unsaturated carboxylic acid, such as glycidyl methacrylate; an α,β-unsaturated dicarboxylic acid, such as maleic acid, fumaric acid, and itaconic acid; and a derivative (monoester, diester, acid anhydride) of an α,β-unsaturated dicarboxylic acid. The thermoplastic elastomer may be used alone, or two or more types thereof may be used in combination.

In addition to the aforementioned components, according to use applications, the PAS resin composition can further contain as an optional component a synthetic resin (hereinafter sometimes simply referred to as synthetic resin) such as a polyester resin, a polyamide resin, a polyimide resin, a polyetherimide resin, a polycarbonate resin, a polyphenylene ether resin, a polysulfone resin, a polyether sulfone resin, a polyetherether ketone resin, a polyether ketone resin, a polyarylene resin, a polyethylene resin, a polypropylene resin, a polytetrafluoroethylene resin, a polydifluoroethylene resin, a polystyrene resin, an ABS resin, a phenol resin, a urethane resin, or a liquid crystal polymer, as appropriate. In the present disclosure, the synthetic resin is not an essential component. When the synthetic resin is mixed, the amount of the synthetic resin mixed is not particularly limited as long as it does not impair the effects of the present disclosure. The amount varies according to the purpose thereof, and cannot be generally defined. For example, the amount of the synthetic resin mixed in the resin composition is within the range of 5 parts by mass or more and 15 parts by mass or less relative to 100 parts by mass of the PAS resin. In other words, the ratio by mass of the PAS resin to the total amount of the PAS resin and the synthetic resin is preferably 100/115 or more, and more preferably 100/105 or more.

Furthermore, the PAS resin composition may contain as an optional component a commonly known additive such as a colorant, an antistat, an antioxidant, a heat-resistant stabilizer, an ultraviolet stabilizer, an ultraviolet absorber, a foaming agent, a flame retarder, a flame retardant promoter, an antirust agent, or a coupling agent, if necessary. The additive is not an essential component. The amount of the additive is preferably within the range of 0.01 parts by mass or more and 1,000 parts by mass or less relative to 100 parts by mass of the PAS resin. The amount of the additive may be appropriately adjusted according to a purpose and use application for use without impairing the effects of the present disclosure.

The method for producing the PAS resin composition includes steps of mixing the PAS resin with the fibrous filler as essential components, and melt-kneading the mixture at a temperature range that is equal to or higher than the melting point of the PAS resin.

The PAS resin composition contains each of the essential components and if necessary, the other optional component. Examples of the method for producing the resin composition include, but not particularly limited to, a method in which the essential components and if necessary, the optional component are mixed and melt-kneaded, and specifically, are mixed uniformly under drying by a tumbler, a Henschel mixer, or the like, if necessary, and then supplied to a twin-screw extruder and melt-kneaded.

Melt-kneading can be performed under heating within a temperature range at which the resin temperature is equal to or higher than the melting point of the PAS resin, a temperature range at which the resin temperature is preferably equal to or higher than the melting point plus 10° C., and a temperature range at which the resin temperature is more preferably equal to or higher than the melting point plus 10° C. or still more preferably equal to or higher than the melting point plus 20° C., and preferably equal to or lower than the melting point plus 100° C. or still more preferably equal to or lower than the melting point plus 50° C.

From the viewpoint of dispersibility and productivity, it is preferable that a melt-kneader be a twin-screw kneading extruder. For example, it is preferable that melt-kneading be performed while the amount of resin component discharged is controlled within the range of 5 to 500 (kg/hr) and the screw rotational speed is controlled within the range of 50 to 500 (rpm) as appropriate, and it is further preferable that melt-kneading be performed under a condition in which the ratio (the amount/the rotational speed) is within the range of 0.02 to 5 (kg/hr/rpm). Each of the components may be added to the melt-kneader and mixed simultaneously or separately. For example, when the additive among the components is added, it is preferable that the additive be supplied to the extruder from a side feeder of the twin-screw kneading extruder from the viewpoint of dispersibility. The side feeder is positioned such that the ratio of the distance between a resin-supplying portion (top feeder) of the extruder and the side feeder to the full length of screw of the twin-screw kneading extruder is preferably 0.1 or more, and more preferably 0.3 or more. The ratio is preferably 0.9 or less, and more preferably 0.7 or less.

The PAS resin composition thus obtained by melt-kneading is a melt-kneaded mixture containing the essential components, and the optional component and a component derived from the optional component added, if necessary. Therefore, the PAS resin composition has morphology in which the PAS resin forms a continuous phase and the other essential component and the optional component are dispersed. It is preferable that after the melt-kneading, a publicly known method be performed, for example, the PAS resin composition in a melted state be extrusion molded into a strand shape and then processed in a form of pellet, chip, granule, powder, or the like, and if necessary, pre-dried within the temperature range of 100 to 150° C.

(Method for Producing Forced Extraction Molded Article)

The forced extraction molded article 1 is formed by melt-molding the PAS resin composition. A method for producing the forced extraction molded article 1 includes a step of melt-molding the PAS resin composition and a step of performing forced extraction of the mold 30 (see FIG. 3). Herein, the forced extraction molded article 1 has morphology in which the PAS resin forms a continuous phase and the other essential component and the optional component are dispersed.

The PAS resin composition may be subjected to various types of molding, such as injection molding, compression molding, composite, sheet, or pipe extrusion molding, drawing molding, blow molding, and transfer molding. The PAS resin composition is particularly suitable for application of injection molding due to excellent mold releasability. Under molding by injection molding, each molding condition is not particularly limited. The PAS resin composition can be molded usually by a general method. For example, after a step of molding the PAS resin composition in an injection molding machine within the temperature range at which the resin temperature is equal to or higher than the melting point of the PAS resin, preferably equal to or higher than the melting point plus 10° C., and more preferably equal to or higher than the melting point plus 20° C., and preferably equal to or lower than the melting point plus 100° C., and more preferably equal to or lower than the melting point plus 50° C. although the upper limit value is not limited, the PAS resin composition may be injected into the mold from a resin discharging port and molded. In this case, the mold temperature may be set within a publicly known temperature range, for example, to room temperature (23° C.) or higher, and preferably 120° C. or higher, and 300° C. or lower, and preferably 180° C. or lower.

Examples of a product formed of the molded article of the PAS resin composition include pipes for transporting a fluid and various parts attached to the pipes, such as a pipe, a lining pipe, a cap nut, a pipe joint (an elbow, a header, a cheese, a reducer, a joint, a coupler, and the like), various valves, a flowmeter, and a gasket (a seal and a packing). Examples thereof include parts attached to internal-combustion engines of an automobile part and the like, such as fuel-involved, exhaust, and intake pipes, an air intake nozzle snorkel, an intake manifold, a fuel pump, an engine cooling water joint, and a water outlet. The product can be adopted also in various use applications.

EXAMPLES

Hereinafter, the present disclosure will be described using Examples and Comparative Examples. However, the disclosure is not limited to Examples. Hereinafter, "%" and "part(s)" are based on mass unless other specified.

(Raw Material)

Raw materials used in Examples and Comparative Examples are as follows.

<<PAS Resin Composition>>

"FZ-2140" available from DIC Corporation (40% of glass fiber as a fibrous filler is mixed in a PPS resin, hereinafter denoted as "PPS+GF40")

"Z-215-G1" available from DIC Corporation (an elastomer and 15% of glass fiber as a fibrous filler are mixed in a PPS resin, hereinafter denoted as "PPS+elastomer+GF15")

"Z-230" available from DIC Corporation (an elastomer and 30% of glass fiber as a fibrous filler are mixed in a PPS resin, hereinafter denoted as "PPS+elastomer+GF30")

"Z-650" available from DIC Corporation (an elastomer and 50% of glass fiber as a fibrous filler are mixed in a PPS resin, hereinafter denoted as "PPS+elastomer+GF/Filler50")

(Evaluation)

Evaluation was performed by computer simulation using data of the PAS resin compositions. As an analysis software, Ansys Mechanical 19.2 available from Ansys was used. An analysis process was a finite element method. Forced extraction molding was simulated, and the maximum principal stress generated (corresponding to tensile stress) was calculated. When the maximum principal stress was more than the tensile strength of the PAS resin composition, it was judged that damage was generated. As illustrated in Table 2 below, an evaluation result in which damage is generated is expressed as "x", an evaluation result in which damage is not generated is expressed as "Δ", and an evaluation result in which damage is not generated at all is expressed as "○". In the evaluation, options of the analysis software were set as follows.

Analyzed material: a nonlinear model was used for each of the PAS resin compositions, and a linear metal mode was used for a mold.

Analyzed shape: cylindrical portions including forced extraction portions having different shapes (pipe shape of axially symmetric two-dimensional model)

Temperature condition: 150° C.

Contact condition: slipping at a friction coefficient between the cylindrical portion and a contact surface (side) of the mold of 0.01, contact with separation, stabilization attenuation: 0.001, normal Lagrange contact model, pinball region: a radius of 0.6 mm, ramp effect of adjustment between contacts: none Constraint condition: a root flange plane of the cylindrical portion is fixed at three axes and constrained Loading condition: the mold is forcedly shifted in an axial direction at 6 mm/5 sec until a bulge is extracted.

Calculation condition: large deflection and weak-spring are turned on.

Meshing condition: a rectangular or triangular two-dimensional mesh is used, and a mesh size is 0.1 to 0.4.

Examples 1 to 5

Comparative Examples 1 to 4

In Examples 1 to 5 and Comparative Examples 1 to 4, a cylindrical portion 10 including a bulge 11 as illustrated in FIG. 1 was set in the computer simulation. The sizes and parameters in Examples 1 to 5 and Comparative Examples 1 to 4 are as listed in Table 1. The evaluation results of the computer simulation in Examples 1 to 5 and Comparative Examples 1 to 4 in which the four PAS resin compositions were included are as listed in Table 2.

TABLE 1

| Size parameter | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Outer diameter C (dimeter) [mm] | 40.0 | 40.0 | 40.0 | 40.0 | 40.0 | 40.0 | 40.0 | 40.0 | 40.0 |
| Outer diameter B (dimeter) [mm] | 38.0 | 38.0 | 38.0 | 38.0 | 38.0 | 38.0 | 38.0 | 38.0 | 38.0 |
| Thickness D2 [mm] | 3.0 | 3.0 | 3.0 | 3.0 | 2.0 | 3.0 | 2.0 | 3.0 | 3.0 |
| Height D4 [mm] | 0.5 | 0.0 | 1.5 | 0.5 | 0.2 | 1.6 | 0.1 | 1.6 | 1.6 |
| Gradient height Dt [mm] | 0.5 | 0.6 | 0.5 | 0.5 | 1.5 | 0.6 | 2.0 | 0.6 | 0.6 |
| Length Li [mm] | 44.0 | 44.0 | 44.0 | 44.0 | 28.0 | 44.0 | 44.0 | 28.0 | 28.0 |
| Distance L3 [mm] | 3.7 | 3.7 | 3.7 | 3.7 | 1.0 | 3.7 | 3.7 | 1.0 | 3.7 |
| Distance L4 [mm] | 6.5 | 0.0 | 6.5 | 7.2 | 19.6 | 2.7 | 2.7 | 19.6 | 2.7 |
| Undercut ratio | 5.3 | 5.3 | 5.3 | 5.3 | 5.3 | 5.3 | 5.3 | 5.3 | 5.3 |
| $((D2/2 - D4)/D2)*(Dt/D2)$ | 0.053 | 0.095 | 0.001 | 0.051 | 0.319 | -0.007 | 0.450 | -0.007 | -0.007 |
| $((L4 - L3)/Li)*(L4/Li)$ | 0.009 | 0.000 | 0.009 | 0.013 | 0.465 | -0.001 | -0.001 | 0.465 | -0.003 |

TABLE 2

| PAS resin composition | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| PPS + GF40 | ○ | ○ | ○ | ○ | Δ | x | x | x | x |
| PPS + elastomer + GF15 | ○ | ○ | ○ | ○ | ○ | x | x | x | x |
| PPS + elastomer + GF30 | ○ | ○ | ○ | ○ | ○ | x | x | x | x |
| PPS + elastomer + GF/Filler 50 | ○ | ○ | ○ | ○ | Δ | x | x | x | x |

As seen from comparison between Examples 1 to 5 and Comparative Examples 1 to 4, even when any PAS resin compositions are included, damage is not generated in Examples 1 to 5 in which equation (a) is satisfied. In Examples 1 to 4, equation (b) is also satisfied. It is confirmed that the effect of preventing damage during forced extraction in Examples 1 to 4, and particularly in a case of using "PPS+GF40" and "PPS+elastomer+GF/Filler50", is higher than that in Example 5 in which only equation (a) is satisfied.

According to the investigation, when the forced extraction molded article 1 including the cylindrical portion 10 satisfies equation (a), the forward end portion 16 is easily bent, and rigidity can be obtained. Therefore, damage during forced extraction can be prevented. When the forced extraction molded article 1 further satisfies equation (b), a stress can be further relaxed while rigidity is obtained. Therefore, the effect of preventing damage during forced extraction can be enhanced.

REFERENCE SIGNS LIST

1 forced extraction molded article
10 cylindrical portion
11 bulge
12 top
13 step
14 connection portion
14a corner
15 forward end
16 forward end portion
17 backward end
18 slope
21 outer surface
22 inner surface
30 mold

The invention claimed is:

1. A forced extraction molded article formed of a polyarylene sulfide resin composition in which a polyarylene sulfide resin is mixed with a fibrous filler, the forced extraction molded article comprising a cylindrical portion, wherein the cylindrical portion has at a forward end portion a bulge that has an undercut shape and is projected in an outer diameter direction, and an inner surface including a step in the outer diameter direction at the forward end portion, a portion excluding the step having a gradient such that an inner diameter of the cylindrical portion increases toward the forward end portion, and equation (a) below using a thickness D2 between a connection portion at the step on the inner surface of the cylindrical portion and the outer surface excluding the bulge, a height D4 of the step, and a height Dt of the gradient excluding the step on the inner surface of the cylindrical portion is satisfied:

[Equation 1]

$$0.001 \leq \frac{\frac{D2}{2} - D4}{D2} \times \frac{Dt}{D2} \leq 0.44. \quad \text{Equation (a)}$$

2. The forced extraction molded article according to claim 1, wherein equation (b) below using a length Li in an axial direction of the cylindrical portion, a distance L3 in the axial direction between a forward end of the cylindrical portion and a top of the bulge, and a distance L4 in the axial direction between the forward end of the cylindrical portion and a connection portion of the step on the inner surface is satisfied:

[Equation 2]

$$-0.001 \leq \frac{L4 - L3}{Li} \times \frac{L4}{Li} \leq 0.46. \quad \text{Equation (b)}$$

3. The forced extraction molded article according to claim 1, wherein the polyarylene sulfide resin composition contains the fibrous filler in an amount of 1 to 300 parts by mass relative to 100 parts by mass of the polyarylene sulfide resin.

4. The forced extraction molded article according to claim 3, wherein the fibrous filler is at least one of a glass fiber, a carbon fiber, a silane glass fiber, a ceramic fiber, an aramid fiber, and a metal fiber.

5. The forced extraction molded article according to claim 1, wherein an undercut ratio represented by equation (c) below using an outer diameter C of the cylindrical portion at a top of the bulge and an outer diameter B of the cylindrical portion excluding the bulge is 5% to 20%:

[Equation 3]

$$\frac{|C - B|}{C} \times 100(\%). \quad \text{Equation (c)}$$

* * * * *